Feb. 16, 1960     E. A. LINDGREN     2,925,457
SCREEN ROOM AIR INLET AND WAVE GUARD
Filed March 23, 1955
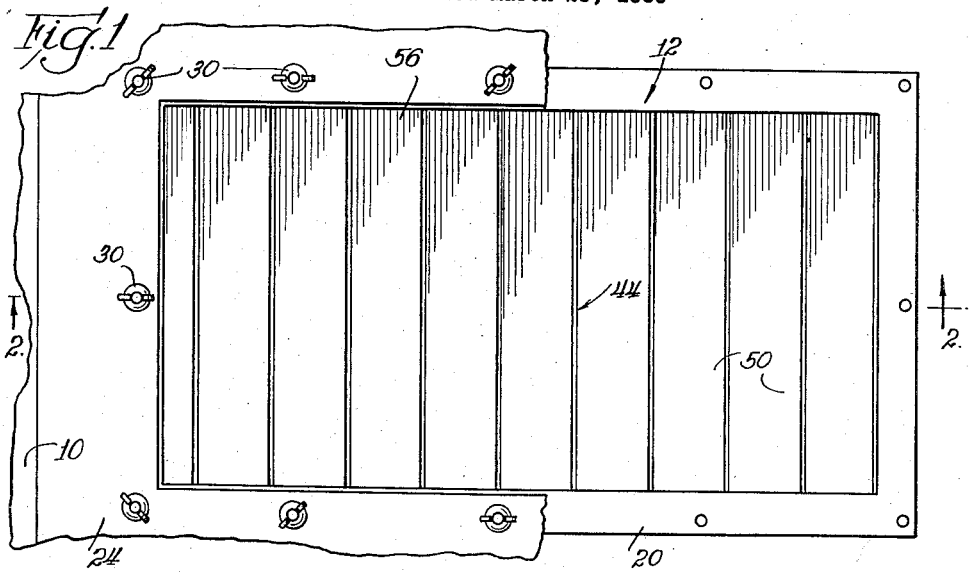
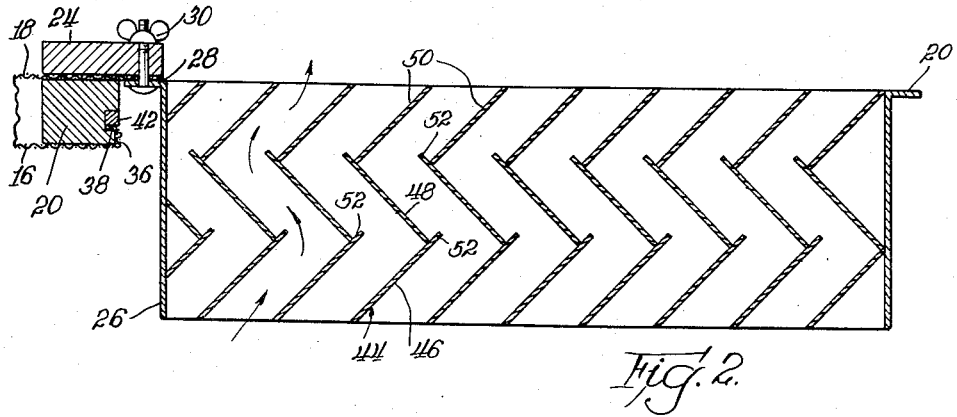
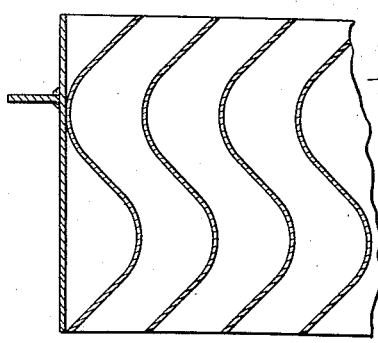
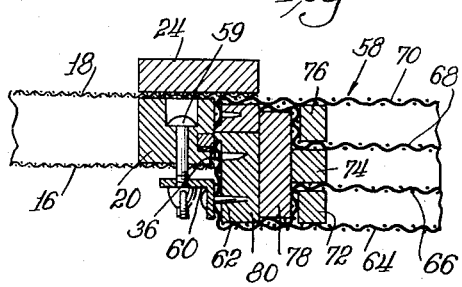
INVENTOR.
Erik A. Lindgren
BY United States Patent Office 2,925,457
Patented Feb. 16, 1960

2,925,457

SCREEN ROOM AIR INLET AND WAVE GUARD

Erik A. Lindgren, Chicago, Ill.

Application March 23, 1955, Serial No. 496,283

6 Claims. (Cl. 174—35)

The present invention is a continuation-in-part of my copending application, Serial No. 308,136, and describes an improvement in the demountable panel screen room for suppression or attenuation of radio waves therein disclosed. The dual screen room construction described in the aforementioned copending application insures electrical continuity between corresponding shielding layers in adjacent wall panel elements as well as between contiguous enclosure walls while insuring electrical isolation as between the different screens.

The shielding efficiency of the screen material utilized relates to the conductivity and the nonpermeability of the material which yet possesses adequate tensile strength to withstand outline suspension. Screens having these characteristics may be disposed in mutually spaced relation about an enclosure, thus improving the quality of wave attenuation and extending the attenuation over a wider range of frequencies. The electrical isolation of inner and outer screens establishes an efficient impedance, upon which condition the effectiveness of attenuation is factorially dependent.

The screens accordingly are preferably formed of fine mesh so as to reduce permeability as far as possible. A double layer of twenty-two mesh copper screening wire or tinned iron wire assures a satisfactory performance and provides an effective barrier against radio waves within the popular communication bands. The attenuation in logarithmic units through a shield layer has been evaluated as proportional to the first power of its thickness and to the square root of its conductivity, permeability and the wave frequency.

While screens having the aforementioned mesh characteristics are preferred for effective attenuation, the dual construction utilized poses a difficult problem in ventilation. Thus the dead air between individual apertures in the mesh tends to create a barrier to the passage of air; and where the screen material is a continuous highly conductive metal sheet (such as extremely thin aluminum foil spread upon a supporting layer of thin cardboard), the ventilation problem is critical.

I have provided an air inlet for my screen room which insures a sufficient supply of air while at the same time providing wave attenuation to an extent comparable to the wave attenuation produced by the dual screening of the screen room itself.

It is accordingly an object of this invention to provide an air inlet and wave guard which will insure the ventilation of the screen room while maintaining the dual screens of the screen room in electrical isolation.

Other objects of the invention are to provide an air inlet and wave guard which will be substantially free of clogging by dust and the like; to provide a wave guard which will maintain high attenuation over the ventilating areas; to provide a wave guard which prevents leakage at the periphery thereof as well as centrally; and to provide a guard which insures a firm connection between the respective shielding layers of the screen room.

A further object of the invention is to provide an air inlet and wave guard which is simple and economical to manufacture and which may be used as a part of my screen room without necessitating unusual or difficult constructions and changes.

Referring now to the drawings,

Figure 1 is a top plan view of an air inlet and wave guard according to the present invention secured in operating position to a screen room, disclosed in fragmentary form.

Figure 2 is a vertical sectional view of the air wave guard disclosed in Figure 1 taken along the line 2—2 of Figure 1.

Figure 3 is a vertical sectional view, partly broken away, of an alternative construction for the air wave guard disclosed in Figures 1 and 2.

Figure 4 is a fragmentary vertical sectional view of yet another embodiment of the screen guard according to the present invention.

Referring now to Figure 1, the screen room 10 is as described in the aforementioned copending application with inner and outer 22 mesh copper screens disposed in spaced, electrically isolated relation about the interior of the screen room. Alternatively, the screen room may be formed from a double wall of highly conductive material such as aluminum (which may be pasted to a thin cardboard material from an eighth to a quarter of an inch in thickness). Correspondingly, the adjacent panel elements are disposed in electrically conductive relation and electrically isolated.

The air inlet and wave guard 12 may be centered in one of the panels of the screen room, and it is preferably supported by the tension of the screening to which it is secured, as seen in Figure 2. Thus, the inner and outer screens 16 and 18 of the screen room panel will be stretched tightly upon the framework of the panel, and the framework secured to the wave guard, to prevent movement of the guard in a direction normal to the screens.

As seen in Figure 2 the portions of the screens 16 and 18 adjacent to the periphery of the wave guard 12 are maintained in spaced apart relationship by means of the wave guard frame 20. The frame 20 preferably has secured thereto by screws or other suitable means a support member 24, which extends inwardly past the frame 20 and is provided with bores spaced at suitable intervals therearound.

The wave guard 12 is provided with a peripheral, substantially rectangular mounting frame 26 having formed around one edge thereof a flange 28 which may be secured to the underside of the support member 24 by bolts 30 passing through the said bores.

The external screen 18 is extended so as to be interposed between the bed 24 and flange 28 in snug engagement with the said flange and tensioned by means of bolts 30 between the guard 12 and the spaced framework of the panel (not disclosed).

In a preferred form of the invention the inner screen 16 is preformed to fit over the land 36 on the edge of the frame 20 to extend within channels 38 rabbeted out of the framing wood in spaced relation to the surfaces which adjacently support the screens 16 and 18. Upon insertion of the strips 42 within the channel 36 a firm and stable anchor will be afforded which will prevent unloosening and fraying of the screen.

This construction permits the innermost screen 16 to be maintained in spaced relation to the outermost screen 18 so that the high impedance characteristics may be preserved, upon which the efficiency of these devices depends.

Alternatively, the interior screen 16 may be simply stapled to the bottom or side of the frame 20. At the same time it will be appreciated that additional nails or staples may be inserted through the element 24 and the screen 18 to insure tight positioning of the screen beyond what is afforded by bolts 30.

The wave guard seen in Figures 1 and 2 utilizes a plurality of spaced apart partitions 44 formed of highly impermeable material such as copper and extending transversely across the frame 26. Each panel or partition is preferably formed of individual sections 46, 48 and 50 joined together adjacent their marginal edges by welding or other suitable means, the line of juncture between adjacent sections being spaced from the marginal edge of the next subjacent panel section and preferably parallel thereto whereby to provide a planar extension 52 adjacent each such junction. The partitions 44 are spaced from each other a distance such that a vertical plane could not be passed between adjacent partitions without intersecting both partitions at some point.

The winding channel thus formed between each pair of adjacent partitions 44 affords an ample supply of air while at the same time insuring that radio waves will not be able to penetrate therethrough in any great strength. Thus waves entering through the openings 56 (Fig. 1) will strike first against the upper sections 50 and the extensions 52 thereon, or against intermediate sections 48, to create a diffusion of the waves; and the waves thus diffused, which proceed inwardly, will be met by the lowest section 46, or the extension 52 thereof.

The nonpermeable characteristic of the partition exceeds that of the screen itself so that (since the attenuation is proportional to the square root of the permeability), the attenuation produced will be more than equal to that provided by that of the dual screen construction itself.

The nonpermeable and highly conductive partitions 44 are grounded to the screen 18 by way of the mounting frame 26 and flange 28 thereon, thus maintaining continuity of electrical contact to produce high attenuation efficiency throughout the intermediate and lower wave bands.

Referring now to Figure 3, a wave guard may be constructed with substantially the same qualities of attenuation efficiency to be found in the guard of Figures 1 and 2 by utilizing sinuous partitions having at least two points of inflection vertically, and again spaced apart so that a plane passed vertically through the guard would intersect at least two partitions with the results described above.

Obviously it is possible to construct a wave guard with even more than two inflections in each partition, the major limitations in this respect being manufacturing cost and ease of air circulation.

Referring now to Figure 4, a third embodiment of the invention is disclosed, having the same qualities as the first two.

When the dual screens are made with the exceedingly fine mesh required for high attenuation or are formed from metal foil as previously described, little or no air will be able to penetrate to the interior of the room. A wider mesh of screen would avoid this difficulty but at the same time would fail to produce the desirable degree of wave attenuation. The embodiment of Figure 4 resolves this difficulty by utilizing a screen mesh which is substantially greater than 22 at the air inlet portion of the screen room, while at the same time doubling the number of layers of screen so that in effect a surface or barrier of substantially equivalent nonpermeability is presented to incoming waves. The basic construction whereby the guard 58 of Figure 4 is secured to the screens 16 and 18 is similar to that used with respect to the first embodiment except that the use of a wooden framework in the guard itself permits the guard to be firmly secured to the support frame of the panel by means of wing bolts 59 held in apertures in the frame 20 and secured to an angle iron 60 disposed peripherally around the guard 58 by means of screws 62 or the like.

The screen 16 is secured to the frame 20 in the same manner as above described, while the screen 18 is passed over a portion of the guard as before, but is set in contact with a coarse screen thereon as will be hereinafter set forth.

The coarse inner screens 64 and 66 and outer screens 68 and 70 on the guard 58 are maintained in suitable spaced relationship by means of wooden spacing blocks 72, 74 and 76. The screen 66 is grounded to the internal screen 64 and the screen 68 is grounded to the external screen 70 by means of an intermediate block 78 disposed between the block 80 to which the angle iron 60 is secured and the three blocks 72, 74 and 76. Block 78 is of somewhat reduced width to accommodate the double thickness of screens at each transverse edge thereof, while block 80 is of sufficient width to form support shoulders for the external screens 64 and 70. External screen 70 is passed beneath support member 24 and over the block 80 into snug contact with the screen 18 to provide continuous shielding across the external surface of the dual screen room, and the inner screen 64 is passed over the opposite shoulder of the block 80 into contact with the screen 16 to provide continuity across the internal surface of the dual screen. Thus the two requirements of electrical continuity for each of the dual screens of the screen room and separation of the screens for high impedance are fulfilled. The area of the wave guard itself is sufficiently small so that the counter posed currents set up in each individual set 64 and 66, and 68 and 70, are minimal.

It will be appreciated that the bowing of the screen 16 at land 38 provides a firm connection with the screen 64, which is stapled to the block 80, since the depressions produced by the staples do not break the continuity of electrical conduction. At the same time, this grooved construction permits screen 70 to be disposed on block 80 in spaced relation to the terminal edge of screen 64.

Block 80 is preferably split so that the block to which the screen 64 is secured is separate from the block to which the screen 70 is secured, thus further providing for separation of the screens 16 and 18 and avoiding leakage between the screens.

By means of the construction outlined, the effectiveness of the screen room is preserved both at those portions contiguous to the wave guard and at the wave guard itself, while an adequate supply of air is always available. To this end, a pair of wave guards, disposed at a substantial distance from one another, may be utilized to provide air convection currents.

While the present invention has been explained and described with reference to certain principles and features, it is to be understood that the principles are susceptible to considerable modification and variation. Accordingly, it is not intended to be limited by the illustrated examples in the accompanying drawings nor by the language chosen in the foregoing description except as indicated in the hereunto appended claims.

I claim:

1. In combination with a shielding room having two shielding layers, an air inlet and wave guard for a radio-wave shielding room comprising four electrically conductive and radio frequency electromagnetic wave impermeable metallic screens of substantially coarser than 22 grade mesh, means adapted to maintain two of said screens in electrical contact with an outer layer of said shielding room, means adapted to maintain the remaining two said screens in electrical contact with an inner layer of said screen room, and means adapted to maintain said screens disposed in electrical contact with said outer layer in electrical isolation with respect to said screens disposed in electrical contact with said inner layer, said screens being disposed in mutually spaced apart and substantially parallel relationship and in parallel relationship to said shielding room layers, an insulating frame interposed peripherally between each pair of adjacent screens adapted to maintain said screens in said spaced apart relation, the means adapted to maintain electrical contact between said screen pairs and said shielding layers including a first frame disposed peripherally of said first-named screen pair adapted to maintain the screens in electrical contact about their margins with said layer and a second frame adapted to maintain the said second screen pair in electrical contact with said inner layer in mutual marginal contact, the said means adapted to maintain electrical contact between said screen pairs and said shieldings including a frame disposed peripherally of said second-named frame and in abutting relation thereto, a frame disposed peripherally of said third-named frame adapted to maintain said inner and outer layers in spaced relation, and a fifth frame disposed in overlying relationship to said third and fourth named frames, said fifth-named frame being adapted to maintain one of said screens having electrical connection with said outer layer in tightly engaged relation with said outer layer and said third and fourth named frames being adapted to maintain one of said screens having electrical connection with said inner layer in tightly engaged relation with said inner layer, and means adapted to secure said third-named frame to said fourth-named frame and said fourth-named frame to said fifth-named frame.

2. In the construction according to claim 1, a peripheral groove formed in said fourth-named frame opposite said third-named frame, and means adapted to secure said inner layer in said groove whereby the portion of said inner layer overlying the land formed between said groove and the inner face of said fourth-named frame is bowed outwardly to press against said screen engaged therewith.

3. In combination with a shielding room having two shielding layers with a ventilation opening therethrough, an air inlet and wave guard in said opening comprising four electrically conductive and radio frequency electromagnetic wave impermeable metallic screens of substantially coarser than 22 grade mesh, means for securing two of said screens in electrical contact marginally with each other and with an inner layer of said screen room, and means for securing said screens disposed in electrical contact with said outer layer in electrical isolation with respect to said screens disposed in electrical contact with said inner layer, said screens being disposed in mutually spaced apart and substantially parallel relationship and in parallel relationship to said shielding room layers.

4. In the construction according to claim 3, an insulating frame interposed peripherally between each pair of adjacent screens adapted to maintain said screens in said spaced apart relation.

5. The construction according to claim 4 in which said means adapted to maintain electrical contact between said screen pairs and said shielding layers includes a first frame disposed peripherally of said first-named screen pair adapted to maintain the screens in electrical contact about their margins with said outer layer and a second frame adapted to maintain the said second screen pair in electrical contact with said inner layer in mutual marginal contact.

6. In combination with a shielding room having two electrically isolated shielding layers with a ventilating opening therethrough, means bordering said opening for securing the margins of said shielding layers around said opening in electrically isolated relationship with the remote faces of the layers exposed, an air inlet and wave guard in said opening comprising a plurality of electrically conductive and radio frequency electromagnetically wave impermeable metallic elements defining openings therethrough greater in size than those in a 22 grade woven wire mesh, said openings being arranged in two sets for each element, the openings in each set being coplanar and the two sets for each element being spaced from each other in parallel relationship, means for electrically connecting the metal portions of said elements bordering the openings in one set with the metal portions bordering the openings in the other set in each of said elements, means for securing one of said elements in electrical contact marginally with the outer layer of said shielding room exposed around said opening, means for securing the other of said elements in electrical contact marginally with the inner layer of said shielding room exposed around said opening, and means for supporting said elements in electrical isolation with respect to each other.

References Cited in the file of this patent
UNITED STATES PATENTS

| | | |
|---|---|---|
| 2,230,261 | Peters et al. | Feb. 4, 1941 |
| 2,364,378 | Levinsen | Dec. 5, 1944 |
| 2,780,705 | Seigmeth | Feb. 5, 1957 |

OTHER REFERENCES

Publication I: ARRL Report 5-48 "Specification and Design Characteristics for ARRL Screen-Room Model 1A and 1B," published by U.S. Naval Air Development Center at Johnsville, Pa., August 11, 1947 (Plate 2 of Appendix A relied on).

Article: "Blackout at Sea" by J. W. Markert, published in Heating and Ventilating, March 1944, pages 55-62.